(12) United States Patent
Scherr

(10) Patent No.: US 8,328,248 B2
(45) Date of Patent: Dec. 11, 2012

(54) LATCH ASSEMBLY

(75) Inventor: Vincent J. Scherr, Rugby, ND (US)

(73) Assignee: Rugby Manufacturing Company, Rugby, ND (US)

( * ) Notice: Subject to any disclaimer, the term of this patent is extended or adjusted under 35 U.S.C. 154(b) by 309 days.

(21) Appl. No.: 12/660,725

(22) Filed: Mar. 3, 2010

(65) Prior Publication Data

US 2011/0215598 A1   Sep. 8, 2011

(51) Int. Cl.
*E05C 3/06* (2006.01)
*E05C 3/00* (2006.01)

(52) U.S. Cl. .......... 292/196; 292/340; 292/341.17; 292/DIG. 15; 292/DIG. 29

(58) Field of Classification Search ......... 292/10, 292/210, 340, 341.17, DIG. 15, DIG. 29, 292/200, 196
See application file for complete search history.

(56) References Cited

U.S. PATENT DOCUMENTS

| | | | | |
|---|---|---|---|---|
| 389,605 A * | 9/1888 | Shaw | | 292/17 |
| 395,129 A * | 12/1888 | Gardner et al. | | 292/202 |
| 431,318 A * | 7/1890 | Behrman | | 292/128 |
| 1,448,058 A * | 3/1923 | Eis et al. | | 200/541 |
| 1,473,834 A * | 11/1923 | Sasgen | | 292/338 |
| 1,615,300 A * | 1/1927 | Cantrell | | 292/256.75 |
| 1,636,549 A * | 7/1927 | Brown | | 292/338 |
| 1,656,394 A * | 1/1928 | Sasgen | | 292/338 |
| 1,720,429 A | 7/1929 | Nein | | |
| 2,496,944 A * | 2/1950 | James | | 292/200 |
| 2,511,998 A * | 6/1950 | Rummelsburg | | 292/17 |
| 2,735,715 A * | 2/1956 | Reifsteck | | 296/51 |
| 3,023,451 A | 3/1962 | Thoel | | |
| 3,261,628 A * | 7/1966 | Kesling | | 292/70 |
| 3,520,568 A * | 7/1970 | White et al. | | 292/255 |
| 3,802,726 A | 4/1974 | Galbreath et al. | | |
| 4,141,582 A | 2/1979 | Streeter | | |
| 4,358,150 A | 11/1982 | Nash | | |
| 4,667,367 A | 5/1987 | White et al. | | |
| 4,691,956 A | 9/1987 | Hodge | | |
| 4,798,407 A | 1/1989 | Miller | | |
| 4,826,237 A | 5/1989 | Socha | | |
| D304,291 S | 10/1989 | Weinerman et al. | | |
| D324,166 S | 2/1992 | Greco | | |
| 5,104,163 A * | 4/1992 | Palmer et al. | | 292/335 |
| 5,324,092 A | 6/1994 | Burg | | |
| 5,450,735 A | 9/1995 | Esaki et al. | | |
| 5,609,373 A | 3/1997 | Gromotka | | |
| D389,397 S | 1/1998 | Stech | | |
| 6,053,545 A | 4/2000 | Asmundson et al. | | |
| D424,405 S | 5/2000 | Schlack et al. | | |

(Continued)

FOREIGN PATENT DOCUMENTS

DE   2754938   *   6/1979

*Primary Examiner* — Carlos Lugo
(74) *Attorney, Agent, or Firm* — Kinney & Lange, P.A.

(57) ABSTRACT

A latch assembly for a tailgate of a truck includes a striker plate, a clasp, a handle, and a fastening mechanism. The clasp is attached to the striker plate and defines a first pivot point. The handle includes a first free end and a second anchored end. The second anchored end is attached to the clasp and defines a second pivot point. The first free end of the handle moves about the both the first pivot point and the second pivot point. The first free end is secured by a spring clip of the fastening mechanism to latch the tailgate of the truck.

19 Claims, 7 Drawing Sheets

U.S. PATENT DOCUMENTS

| | | |
|---|---|---|
| 6,279,979 B1 | 8/2001 | Cauley |
| 6,322,114 B1 * | 11/2001 | Kurachi et al. .......... 292/341.17 |
| 6,550,838 B2 | 4/2003 | Bobbitt, III et al. |
| D496,619 S | 9/2004 | Boe |
| D498,407 S | 11/2004 | Layton |
| 6,854,775 B2 | 2/2005 | Senn |
| 6,860,530 B2 | 3/2005 | Senn |
| 6,905,152 B1 | 6/2005 | Hudson |
| 7,252,317 B2 | 8/2007 | Boe |
| 7,296,448 B1 | 11/2007 | Shaw |
| 7,404,448 B2 | 7/2008 | Tuttle et al. |
| D601,403 S | 10/2009 | Cosby et al. |
| D605,493 S | 12/2009 | Tejszerski |

* cited by examiner

LATCH ASSEMBLY

BACKGROUND

This invention relates generally to latch assemblies, and more specifically, latch assemblies for tailgates of trucks.

Dump trucks are commonly used to haul bulk materials such as aggregate, sand, gravel, dirt and the like. A pivotal dump body is located behind the cab for operation by a hoist between a down or level position for loading and travel, and a raised or tilted position wherein the load can be unloaded by dumping out the rear tailgate.

Such tailgates are typically connected to the dump bodies by top pivots and secured by bottom latches, which the driver can operate from the cab to either lock or release the tailgate as desired. The top pivots are usually fixed so that the tailgate can only open from the bottom, which in turn results in the load being dumped directly behind the truck.

The top pivot pins of some tailgates are removable. This allows the tailgate to be opened from the top, about the bottom latch, so that the load can be dumped further behind the truck. This can be very useful when, for example, it is not possible to back the truck up to the place where the load is to be used.

SUMMARY

A first embodiment according to the present disclosure is a latch assembly for a tailgate on a truck. The tailgate includes a shaft extending perpendicular from a top of the tailgate. The latch assembly includes a striker plate, a clasp, a handle, and a fastening mechanism. The striker plate has a first notch, which partially surrounds the shaft of the tailgate. The clasp has a second notch sized to partially surround the shaft of the tailgate. The clasp is attached to the striker plate and defines a first pivot point. The handle includes a first free end and a second anchored end. The second anchored end is attached to the clasp and defines a second pivot point. The fastening mechanism is attached to the striker plate. The first free end of the handle moves about both the first pivot point and the second pivot point. The first free end is secured by a spring clip of the fastening mechanism to latch the tailgate of the truck.

A second embodiment according to the present disclosure is a latch assembly including a L-shaped striker plate, a U-shaped bracket, a handle, and a fastening mechanism. The L-shaped striker plate includes a back plate attached to a base plate at an approximately right angle. The U-shaped bracket is attached to the back plate at an end opposite the approximately right angle and the attachment between the back plate and the U-shaped bracket defines a horizontal axis. The U-shaped bracket extends from the back plate parallel to the base plate. The handle includes a projection and a jaw. The projection has a first free end and a second anchored end, which is attached to the jaw. The jaw is attached to the U-shaped bracket and defines a vertical axis. The fastening mechanism is attached to the striker plate adjacent the approximately right angle. The fastening mechanism includes a spring clip. The first free end of the projection moves about both the horizontal axis and the vertical axis. The first free end is releasably secured by the spring member.

A third embodiment according to the present disclosure is a latch assembly including a striker plate, a clasp, a handle, and a fastening mechanism. The striker plate includes a back plate, a base plate, a guide plate, and a screw bracket. The back plate and the base plate are joined at a first approximately right angle. The back plate has a first notch at an end opposite the first approximately right angle. The guide plate extends at a second approximately right angle from the back plate. The guide plate has a second notch at an end opposite the second approximately right angle. The screw bracket extends between the back plate, the base plate and the guide plate. The clasp includes a U-shaped bracket and a clasp plate having a third notch. The U-shaped bracket has two arms and each arm extends at third approximately right angles from a flat center portion. The flat center portion is attached to a first end of the clasp plate. A second end of the clasp plate is attached to the back plate of the striker plate and defines a first pivot point. The U-shaped bracket extends from the clasp plate parallel to the guide plate and the base plate. The handle includes a projection and a jaw. The projection has a first free end and a second anchored end attached to a center of the jaw. The jaw has an upper jaw and a lower jaw extending from either side of the center. The upper jaw is attached to one arm of the U-shaped bracket, and the lower jaw is attached to the other arm of the U-shaped bracket, the attachment defining a second pivot point. The fastening mechanism is attached to the screw bracket. The fastening mechanism includes a spring member having a resilient opening that expands to receive the first free end of the projection and contracts to retain the first free end of the projection.

DETAILED DESCRIPTION

Previous latch assemblies for use on tailgates of trucks included removable pivot pins as described in U.S. Pat. No. 6,053,545, which is hereby incorporated by reference. Removable pivot pins, however, presented certain difficulties: pins can easily become lost and pins can bind thereby becoming difficult to remove and/or replace. A latch assembly in accordance with the present disclosure has no removable parts to loose and is resistant to binding.

Figure 1:
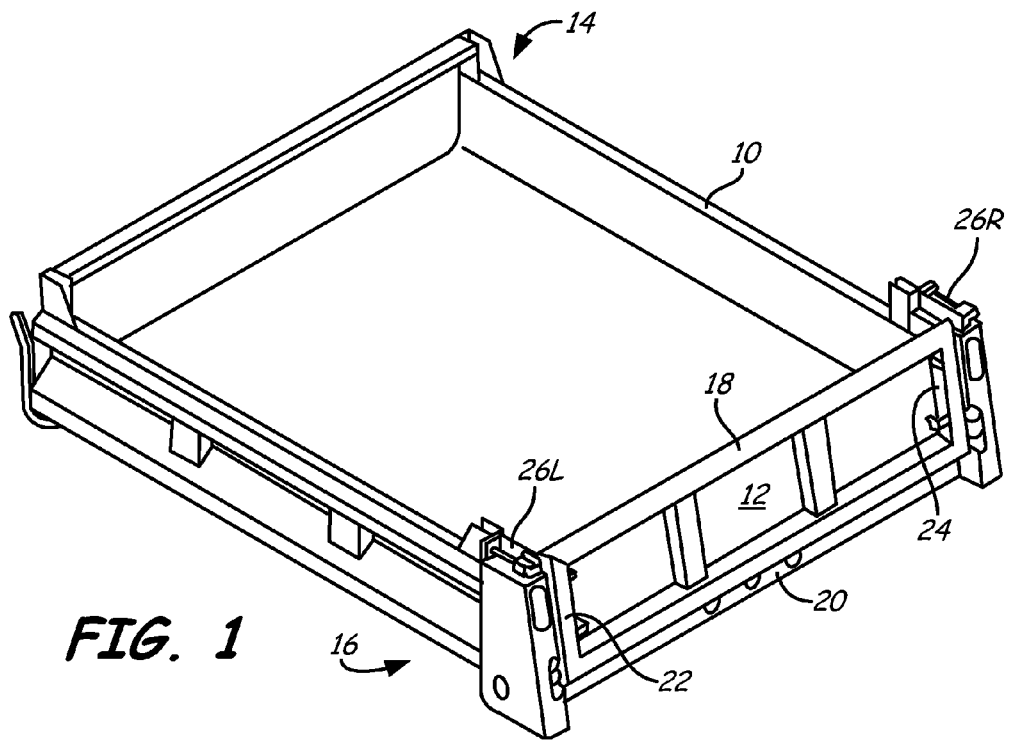
FIG. 1 is a perspective view of a truck body having latch assemblies in accordance with the present disclosure.

FIG. 1 is a perspective view of body 10 and tailgate 12 of a truck. Body 10 has front 14 for attachment adjacent a cab of the truck (not illustrated) and rear 16 for attachment of tailgate 12. Tailgate 12 is rectangular and dimensionally defined by top 18, bottom 20, left side 22, and right side 24. Located at rear 16 of body 10 in an upper left corner of tailgate 12 formed by top 18 and left side 22 is left latch assembly 26L.

Located at rear 16 of body 10 in an upper right corner of tailgate 12 formed by top 18 and right side 24 is right latch assembly 26R.

Body 10 has upstanding walls on all four sides to form a bin for retaining material. Tailgate 12 is one of the upstanding walls of body 10. Front 14 of body 10 is commonly attached to a frame for a truck through a pivot. Rear 16 of body 10 is designed for unloading of materials retained in body 10. Tailgate 12 extends across rear 16 of body 10 for facilitating unloading of retained materials.

Top 18 defines the uppermost portion of tailgate 12, bottom 20 defines the lowermost portion of tailgate 20, left side 22 the left most portion of tailgate 12, and right side 24 the right most portion of tailgate 12. Tailgate 12 can hinge at an axis extending along top 18 such that bottom 20 moves outwardly and upwardly, or tailgate 12 can hinge at an axis extending along bottom 20 such that top 18 moves outwardly and downwardly or rotates about a pivot.

Left latch assembly 26L is located at the upper left corner of tailgate 12 formed by top 18 and left side 22. Right latch assembly 26R is located at the upper right corner of tailgate 12 formed by top 18 and right side 24. Both left latch assembly 26L and right latch assembly 26R are depicted in a latched condition. When latched, left latch assembly 26L is attached to both tailgate 12 and rear 16 of body 10 to secure top 18 of tailgate 12 to body 10. When latched, right latch assembly 26R is attached to both tailgate 12 and rear 16 of body to secure top 18 of tailgate to body 10. As described more fully below, latch assemblies 26L & 26R are easily unlatched allowing tailgate 12 to hinge at bottom 20 for access to material retained by body 10.

Figure 2:
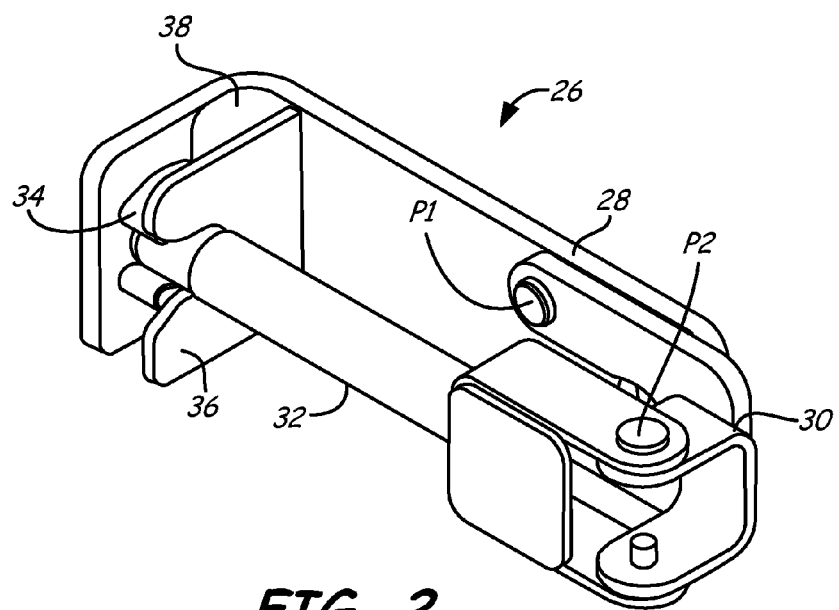
FIG. 2 is a perspective view of a single latch assembly.

FIG. 2 is a perspective view of left latch assembly 26L removed from body 10 and tailgate 12. Left latch assembly 26L is simply a mirror image of right latch assembly 26R, which for simplicity will be described collectively as latch assembly 26. Depicted in FIG. 2 are the components of latch assembly 26: striker plate 28, clasp 30, handle 32, and fastening mechanism 34, guide plate 36, and screw bracket 38. Latch assembly 26 may comprise mild steel, stainless steel, aluminum, or another other suitable metal alloy or robust material.

Striker plate 28 is shaped like the letter "L" and includes the characteristic approximately right angle (about 90 degrees). Attached to a side of striker plate 28 opposite of its approximately right angle is clasp 30 and the attachment defines first pivot point ("P1"). Clasp 30 extends from striker plate 28 at an approximately right angle to attach with handle 32 and the attachment defines second pivot point ("P2"). Handle 32 extends from its attachment to clasp 30 at an approximately right angle toward fastening mechanism 34. Guide plate 36 extends from striker plate 28 at an approximately right angle to contact handle 32. In FIG. 2, an end of handle 32 is received through guide plate 36 and into fastening mechanism 34. Screw bracket 38 is attached to striker plate 28 at its approximately right angle. Screw bracket 38 is also attached to guide plate 36 and fastening mechanism 34.

Striker plate 28 is akin to the backbone of latch assembly 26. In use, striker plate 28 is attached to tailgate 12, which is described more fully below with regards to FIG. 10. The attachment between striker plate 28 and clasp 30 forms first pivot point P1 for vertical movement of handle 32, which is described more fully below with regards to FIGS. 11B-11C. The attachment between clasp 30 and handle 32 forms second pivot point P2 for horizontal movement of handle 32, which is described more fully below with regards to FIGS. 11A-11B. Fastening mechanism 34 secures a free end of handle 32 to striker plate 28. Guide plate 36 aids in guiding the free end of handle 32 to fastening mechanism and screw bracket 38 distributes forces from handle 32 and fastening mechanism 34 to striker plate 28.

Figure 3:
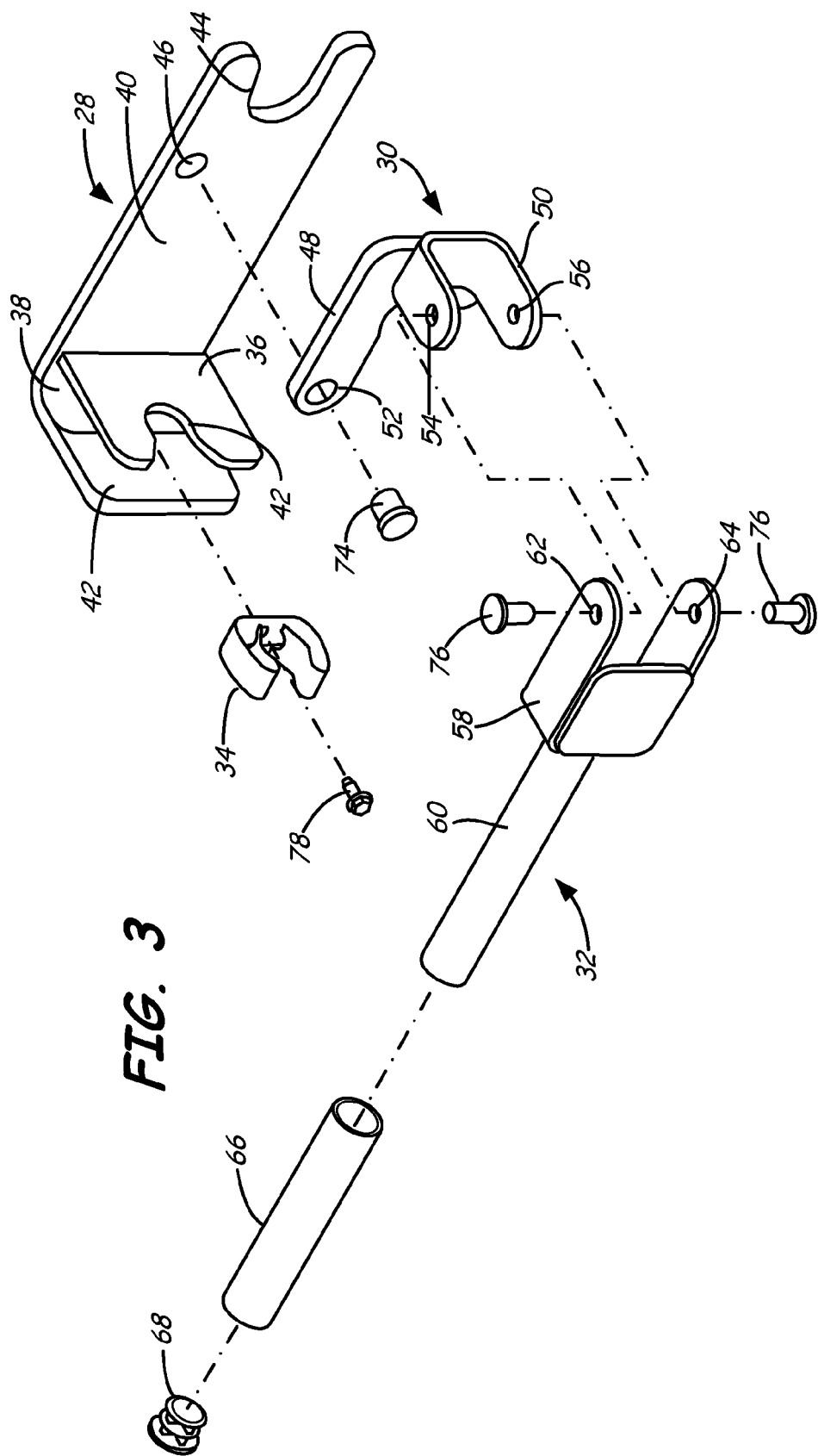
FIG. 3 is an exploded view of the latch assembly from FIG. 2.

FIG. 3 is an exploded view of latch assembly 26. Depicted in FIG. 3 are the components of latch assembly 26: striker plate 28, clasp 30, handle 32, and fastening mechanism 34, guide plate 36, and screw bracket 38. Also shown are the subcomponents of striker plate 28: back plate 40, base plate 42, first notch 44, and first aperture 46; the subcomponents of clasp 30: clasp plate 48, U-shaped bracket 50, second aperture 52, third aperture 54, and fourth aperture 56; the subcomponents of handle 32: jaw 58, projection 60, fifth aperture 62, sixth aperture 64, grip 66 and plug 68; the subcomponent of fastening mechanism 34: spring clip 70; the subcomponent of guide plate 36: second notch 72; and means for attaching the components of latch assembly 26: clevis pin 74; rivets 76; and screw 78.

Striker plate 28 includes back plate 40 attached to base plate 42, as well as first notch 44 and first aperture 46. Back plate 40 and base plate 42 are joined at an approximately right angle to form the L-shape of striker plate 28. At an end of back plate 40 opposite the approximately right angle and base plate 42 is first notch 44. First notch 44 extends into base plate 42 toward the approximately right angle and is approximately semicircular in profile. More specifically, first notch 44 has a profile to mate with a shaft of tailgate 12 (shown in FIG. 10). First aperture 46 is a circular void extending through back plate 40 and is sized to receive a fastening means (such as clevis pin 74).

Clasp 30 includes clasp plate 48, U-shaped bracket 50, second aperture 52, third aperture 54, and fourth aperture 56. Clasp plate 48 is elongated and attached at a first end to U-shaped bracket 50. U-shaped bracket 50 extends at an approximately right angle from clasp plate 48. Opposite the attachment of U-shaped bracket 50 to clasp plate 48, second aperture 52 extends through clasp plate 48. Second aperture 52 is similar to first aperture 46 in that it is a circular void sized to receive a fastening means (such as clevis pin 74). Extending through ends of U-shaped bracket 50 opposite its attachment to clasp plate 48, are third aperture 54 and fourth aperture 56. Third aperture 54 and fourth aperture 56 are circular voids sized to receive a fastening means (such as rivets 76).

Handle 32 includes jaw 58, projection 60, fifth aperture 62, sixth aperture 64, grip 66, and plug 68. Jaw 58 is generally shaped like the letter "U" and attached at a central location of the base of the "U" to projection 60. Projection 60 has a first anchored end attached to jaw 58 and a second free end. Opposite the attachment of projection 60 and jaw 58, fifth aperture 62 and sixth aperture 64 extend through jaw 58. Like the apertures described above, fifth aperture 62 and six aperture 64 are circular voids for receiving fastening means (such as rivets 76). Grip 66 is sized to fit over handle 60 for increasing a user's comfort. In the depicted embodiment, projection 60 is cylindrical and therefore, grip 66 is cylindrical, although the invention is not so limited so long as grip 66 and projection 60 mate. Plug 68 fits in the free end of projection 60 to secure grip 66 onto projection 60.

Fastening member 34 is generally shaped like the letter "C" and includes spring clip 70. Spring clip 70 has a resilient opening which is sized to receive the free end of projection 60. More specifically, spring clip 70 expands slightly to accept free end of projection 60 and contracts slightly to retain free end of projection 60. Extending into an end of guide plate 36 opposite its attachment to back plate 28 is second notch 72. Second notch 72 is semicircular in profile and sized to receive and guide projection 60 to spring clip 70.

In the depicted embodiment, guide plate 36 and screw bracket 38 are permanently attached (i.e. welded) to striker plate 28. Clasp 30, handle 32, and fastening mechanism 70 are attached into their respective locations via removable fastening means. Clevis pin 74 extends through second aperture 52 of clasp plate 48 and first aperture 46 of back plate 40 to secure clasp 30 to striker plate 28. Clevis pin 74 also defines first pivot axis P1 for vertical movement of handle 32 (shown in FIGS. 11B-11C). Third aperture 54 on U-shaped bracket 50 is aligned with fifth aperture 62 on jaw 58 and secured by rivet 76. Similarly, fourth aperture 56 of U-shaped bracket 50 is aligned with sixth aperture 64 of jaw 58 and secured by rivet 76. Rivets 76 then attach clasp 30 to handle 32 and define second pivot axis P2 for horizontal movement of handle 32 (shown in FIGS. 11A-11B). In an alternative embodiment, a singular rivet attaches clasp 30 to handle 32. Screw 78 extends through a center of spring clip 70 and into screw bracket 38 to secure fastening mechanism 34 to striker plate 28. The free end of handle 32 moves vertically about P1 horizontally about P2 to open tailgate 12 and the free end of handle 32 is secured by spring clip 70 to latch tailgate 12.

Figure 4:
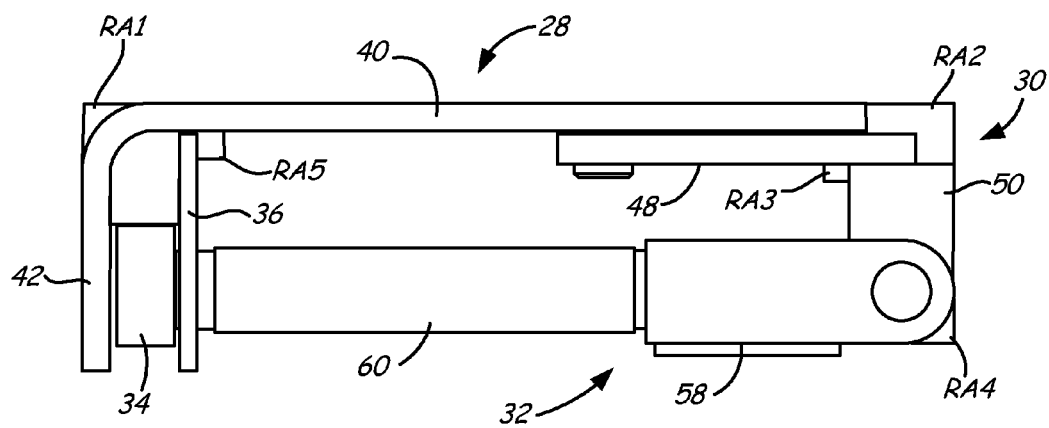
FIG. 4 is a top plan view of the latch assembly from FIG. 2.

FIG. 4 is a top view of latch assembly 26. Depicted in FIG. 4 are the approximately right angles of attachment between the components and subcomponents of latch assembly 26. More specifically, approximately right angle 1 ("RA1") is shown between back plate 40 and base plate 42 of striker plate 28; approximately right angle 2 ("RA2") is shown between striker plate 28 and clasp 30 (clasp plate 48 attaches U-shaped bracket 50 at RA2 with respect to back plate 40); approximately right angle 3 ("RA3") is shown between clasp plate 48 and U-shaped bracket; approximately right angle 4 ("RA4") is shown between clasp 30 and handle 32 (U-shaped bracket 50 is attached to jaw 58 at RA4); and approximately right angle 5 ("RA5") is shown between guide plate 36 and back plate 40.

Back plate 40 and base plate 42 are approximately perpendicular to one another and attached at RA1. RA1 forms the characteristic bend in L-shaped striker plate 28, and may be curved as depicted. Clasp 30 extends perpendicularly from back plate 28 such that clasp 30 and back plate 28 form RA2. Clasp plate 48 is attached in parallel with back plate 28. Clasp plate 48 and U-shaped bracket 50 are perpendicular to one another and attached at RA3. Clasp 30 and handle 32 are arranged perpendicularly since U-shaped bracket 50 is attached to jaw 58 at RA4. Handle 32 is therefore, substantially parallel to back plate 40 when free end of projection 60 is received into fastening mechanism 34. Guide plate 36 is attached to striker plate 28 at RA5 such that guide plate 36 is perpendicular to back plate 40 and parallel to both base plate 42 and U-shaped bracket 50. As illustrated, when in a latched positioned, the components of latch assembly 26 are arranged in an approximately rectangular prism.

Figure 5:
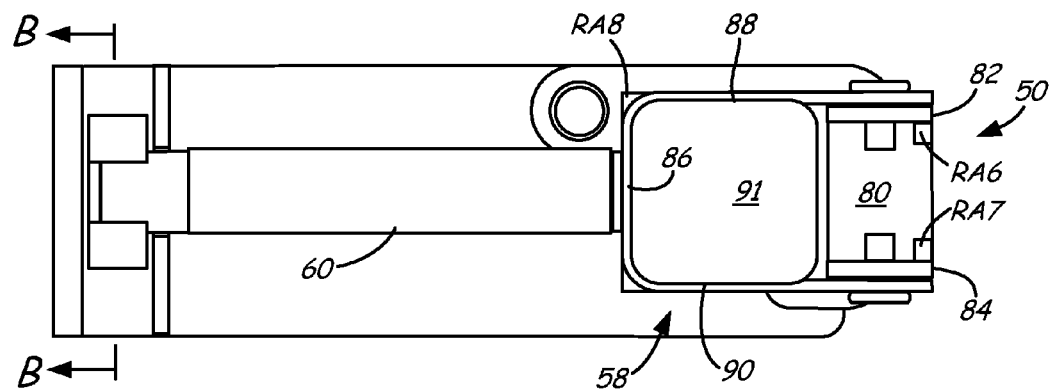
FIG. 5 is a front elevation view of the latch assembly from FIG. 2.

FIG. 5 is a front view of latch assembly 26. Depicted in FIG. 5 is the hinge relationship between U-shaped bracket 50 of clasp 30 and jaw 58 of handle 32. U-shaped bracket includes first flat center 80, first arm 82, second arm 84, approximately right angle 6 ("RA6") and approximately right angle 7 ("RA7"). Jaw 58 includes second flat center 86, upper jaw 88, lower jaw 90, decal plate 91, approximately right angle 8 ("RA8"), and approximately right angle 9 ("RA9").

U-shaped bracket 50 is formed from first flat center 80 and upstanding perpendicular arms. First arm 82 is attached to flat center 80 at RA6 and second arm 84 is attached to flat center 80 at RA7. Jaw 58 is also substantially flat, but oriented in a plane perpendicular to that of U-shaped bracket 50. Second flat center 86 is attached at its center to handle 60 and at either end to perpendicular upper and lower jaws 88 and 90. Upper jaw 88 is attached to second flat center 86 at RA8 and lower jaw 90 is attached to second flat center 86 at RA9. Attached to flat center 86, upper jaw 88, and lower jaw 90 is rectangular decal plate 91, which increases the strength of handle 32. An end of upper jaw 88 opposite second flat center 86 is attached to an end of first arm 82 opposite first flat center 80. An end of lower jaw 90 opposite second flat center 86 is attached to an end of second arm opposite first flat center 80. In one embodiment, upper jaw 88 and lower jaw 90 are spaced approximately 5.46 cm (2.15 in) apart and first arm 82 and second arm 84 are spaced approximately 4.70 cm (1.85 in) apart, such that jaw 58 can be attached to an outside of U-shaped bracket 50. Alternatively, jaw 58 can be attached to an inside of U-shaped bracket 50 so long as jaw 58 and U-shaped bracket 50 form a hinge for the free end of handle 60 to swing laterally (shown in FIGS. 11A-11B).

Figure 6:
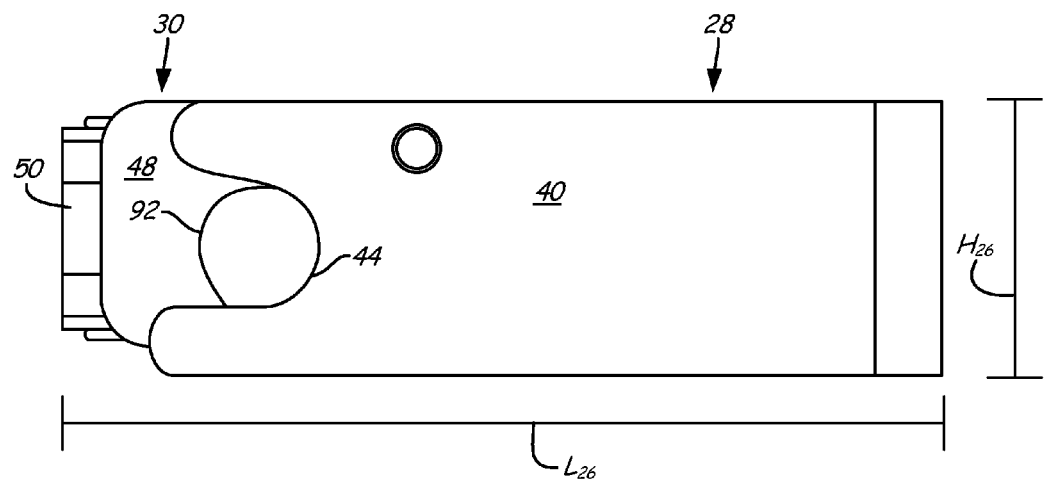
FIG. 6 is a rear plan view of the latch assembly from FIG. 2.

FIG. 6 is a rear view of latch assembly 26. FIG. 6 further illustrates the relationship between striker plate 28 and clasp 30 as well as approximate dimensions for latch assembly 26. Depicted are: back plate 40, first notch 44, clasp plate 48, U-shaped bracket 50, and third notch 92. In one embodiment, latch assembly 26 has an overall length $L_{26}$ of approximately 23.65 cm (9.31 in) and an overall height $H_{26}$ of approximately 7.47 cm (2.94 in) to fit truck design. In alternative embodiments, latch assembly 26 has overall length $L_{26}$ between approximately 12.7 cm and 38.1 cm (5-15 in).

Clasp plate 48 extends beyond an end of back plate 40 and U-shaped bracket 50 extends beyond an end of clasp plate 48. First notch 44 and third notch 92 are both semi-circular in profile such that when combined they form an approximate circle for surrounding a shaft of tailgate 12.

Figure 7:
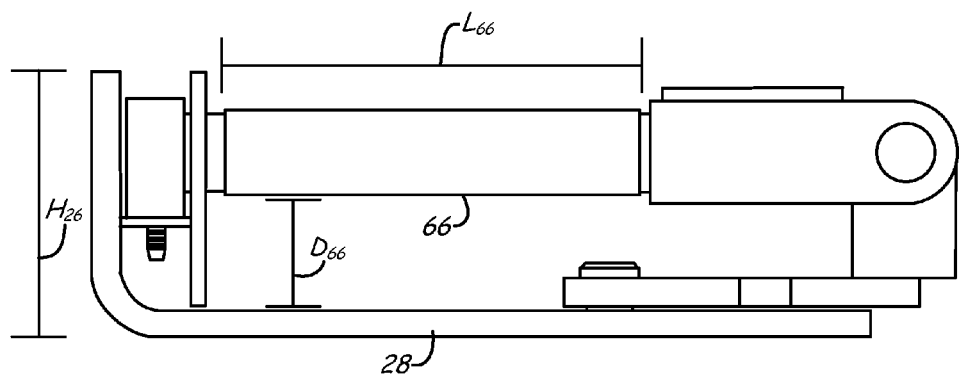
FIG. 7 is a bottom elevation view of the latch assembly from FIG. 2.

FIG. 7 is a bottom view of latch assembly 26. FIG. 7 illustrates approximate dimensions for latch assembly 26 and grip 66. In one embodiment, latch assembly 26 has an overall width $W_{26}$ of approximately 7.40 cm (2.91 in). Grip 66 has a length $L_{66}$ of approximately 12.29 cm (4.84 in) and is spaced from back plate 28 at a depth $D_{66}$ of approximately 3.30 cm (1.29 in).

Figure 8:
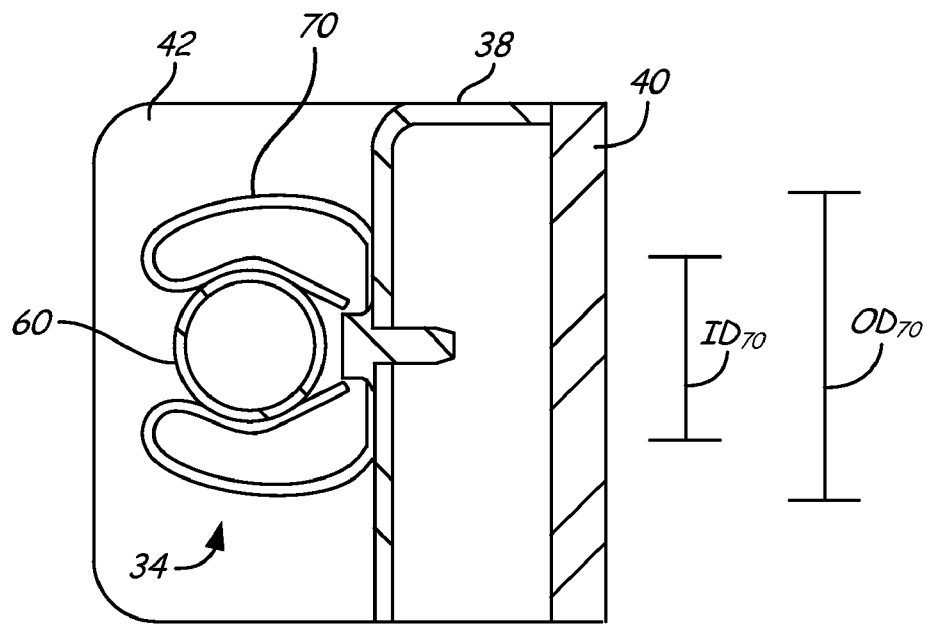
FIG. 8 is a cross section of the latch assembly taken along line B-B of FIG. 5.

FIG. 8 is a cross section of the latch assembly 26 taken along line B of FIG. 5. Depicted in FIG. 8 are: fastening mechanism 34, screw bracket 38, back plate 40, base plate 42, projection 60, spring clip 70, and dimensions of spring clip 70. Fastening mechanism 34 is attached to loaded plate and screw bracket 38 is attached to both back plate 40 and base plate 42. Projection 60 is received into an opening of fastening mechanism 34. In the illustrated embodiment, fastening mechanism 34 comprises spring clip 70. Spring clip 70 is generally C-shaped and has an outer diameter $OD_{70}$ of approximately 4.14 cm (1.63 in) and an inner diameter $ID_{70}$ of approximately 1.91 cm (0.75 in) to create tension. Spring clip 70 is resilient such that the opening can expand to receive the free end of projection 60.

Figure 9:
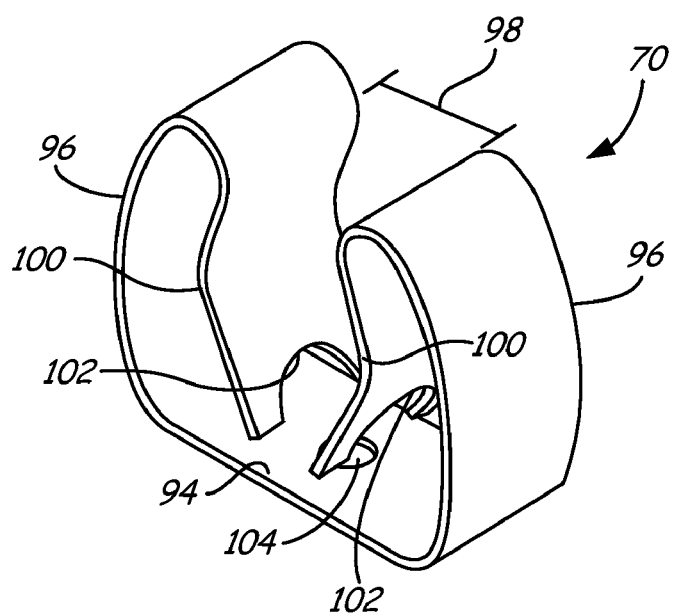
FIG. 9 is a perspective view of a fastening mechanism for the latch assembly.

FIG. 9 is a perspective view of spring clip 70 for use in latch assembly 26. Depicted in FIG. 9 are subcomponents of spring clip 70: back 94, outside curves 96, mouth 98, inside curves 100, fourth notches 102, and seventh aperture 104. Spring clip 70 is generally C-shaped with flat back 94. Extending from either side of back 94 are convex outside curves 96. Outside curves 96 converge at an open space designated mouth 98 before turning inwardly toward back 94 thereby becoming inside curves 100. Inside curves 100 follow the profile of outside curves 96 and are therefore, appear concave. At an end of inside curves 100 nearest to back 94 are semicircular fourth notches 102. In a center of back 94 is seventh aperture 104 for receiving a fastening means (such as screw 78 for securing spring clip 70 to base plate 38). As described above, spring clip 70 is configured to receive the free end of projection 60.

As projection 60 enters mouth 98, it exerts an outward force such that spring clip 70 expands slightly. Once within mouth 98, spring clip 70 contracts back to its biased shape such that an outer diameter of projection 60 rests against inside curves 100.

Figure 10:
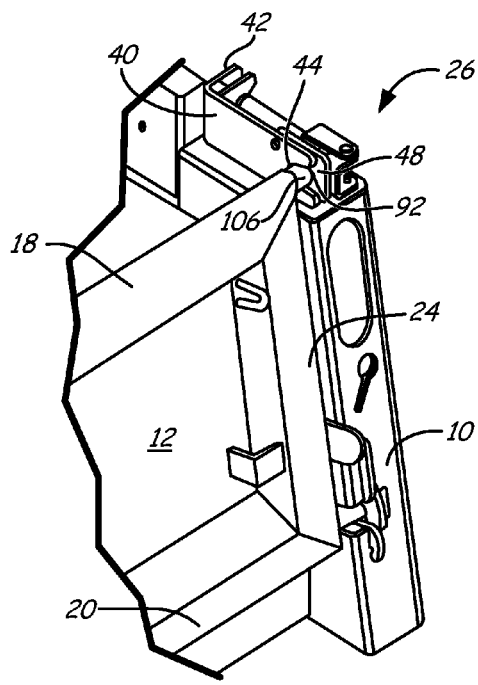
FIG. 10 is a detail perspective view of the latch assembly attached to the truck taken along line A of FIG. 1.

FIG. 10 is a detail view of tailgate 12 and latch assembly 26 taken along line A of FIG. 1. The attachment of latch assembly 26 to tailgate 12 is illustrated in FIG. 10. Shown are the components of tailgate 12: top 18, bottom 20, right side 24, and shaft 106; as well as the components of latch assembly 26: back plate 40, base plate 42, first notch 44, clasp plate 48, and third notch 94. Latch assembly 26 is attached to both body 10 and tailgate 12 of the truck. More specifically, a bottom edge of base plate 40 and back plate 42 are attached to body 10 of truck. Shaft 106 extends from the upper right hand corner of tailgate 12 formed between top 18 and right side 24. Shaft 106 extends in line with top 18, perpendicular to right side 24, and is received into latch assembly 26. As shown in FIG. 6, first notch 44 of back plate 40 and third notch 92 have semicircular profiles to mate with shaft 106 when latch assembly 26 is latched.

Figures 11A, 11B, 11C:
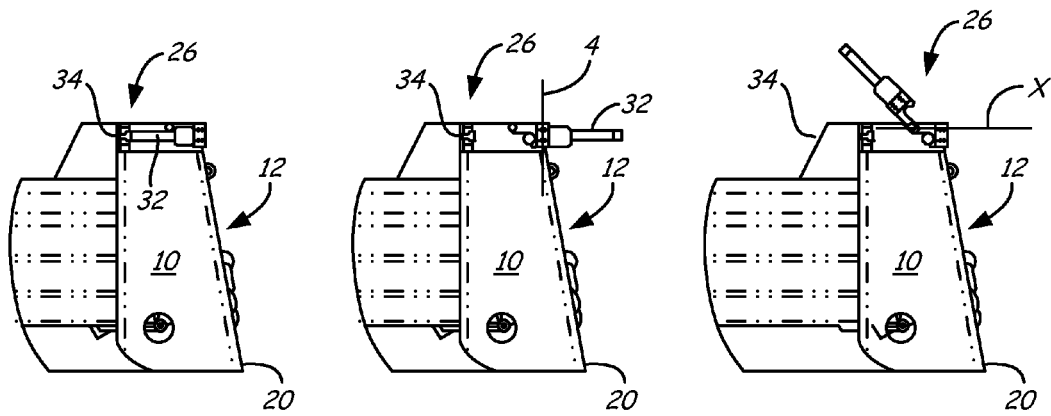
FIGS. 11A-11C are a series of elevation views depicting use of the latch assembly.

FIGS. 11A-11C are a series of images depicting use of latch assembly 26. FIG. 11A shows latch assembly 26 in a latched position, FIG. 11B shows latch assembly 26 in a partially open position, and FIG. 11C shows latch assembly 26 in an open position. The components of interest are body 10, tailgate 12, bottom 20, handle 32, and fastening mechanism 34, as well as vertical "y" axis and horizontal "x" axis. In FIG. 11A the free end of handle 32 is received into fastening mechanism 34 thereby securing top 18 of tailgate 12 to body 10 of truck. In FIG. 11B the free end of handle 32 has been pulled out of fastening mechanism 34 and moved laterally about vertical axis y. The hinge formed between U-shaped bracket 50 and jaw 58 defines vertical axis y and allows free end of handle 32 to move approximately 180 degrees about second pivot point P2 (see FIG. 2). Top 18 of tailgate 12, however, is not yet released from body 10 because third notch 92 still surrounds shaft 106. In FIG. 11C the free end of handle 32 has been lifted up and back about horizontal axis x to free shaft 106 from third notch 92. The attachment between clasp plate 48 and back plate 40 defines horizontal x and allows free end of handle 32 to move approximately 180 degrees about first pivot point P1 (see FIG. 2). From this fully opened position, latch assembly 26 is no longer attached to tailgate 12, which is free to hinge open about bottom 20.

Figure 12:
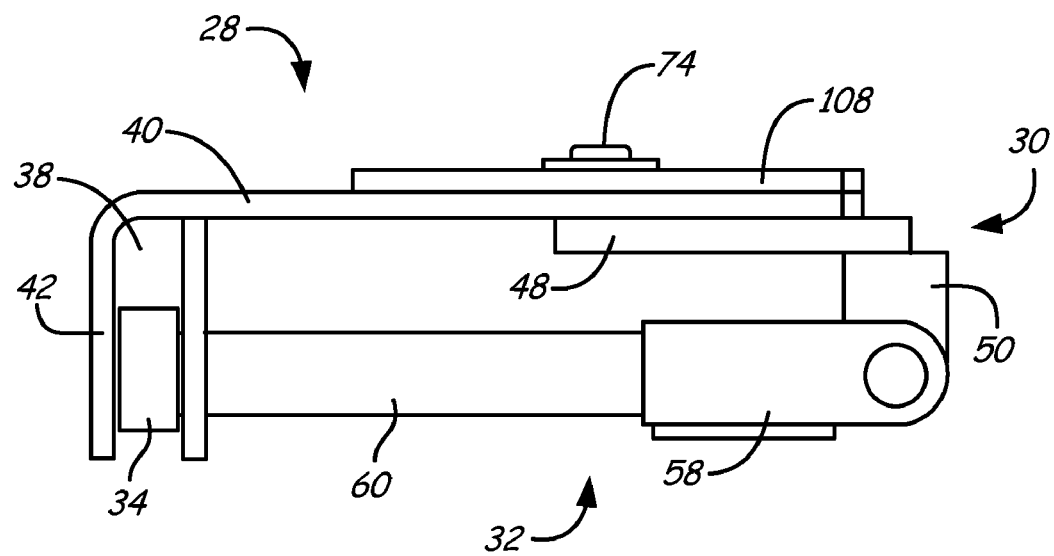
FIG. 12 is a top plan view of an alternative embodiment of the latch assembly.

FIG. 12 is a top view of an alternative embodiment of latch assembly 26'. Like latch assembly 26 described above, latch assembly 26' includes striker plate 28, clasp 30, handle 32, and fastening mechanism 34, guide plate 36, and screw bracket 38. Latch assembly 26' also has the subcomponents described above with respect latch assembly 26. Shown in FIG. 12 are back plate 40, base plate 42, clasp plate 48, U-shaped bracket 50, jaw 58, projection 60, and clevis pin 74. Since latch assembly 26' is so similar to latch assembly 26, the discussion of FIG. 12 will focus mainly on differences between the latches. Most notably, the presence of reinforcement plate 108.

Striker plate 28 is structurally reinforced by the addition of reinforcement plate 108. Reinforcement plate 108 is parallel to back plate 40 and clasp plate 48. In the depicted embodiment, reinforcement plate 108 extends across back plate 40 from a location near RA3 to a location approximately two thirds of the distance to RA5. Reinforcement plate 108 is attached to back plate 40 by clevis pin 74. Clevis pin 74 extends through clasp plate 48, back plate 40, and reinforcement plate 108 in that order such that back plate 40 is sandwiched between clasp plate 48 and reinforcement plate 108. Clevis pin 74 can be replaced by any suitable means for fastening such as a screw and nut. Reinforcement plate 108 is particularly useful for reinforcing the strength of back plate 40 when latch assembly 26' is formed from a softer material, such as but not limited to, aluminum.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment(s) disclosed, but that the invention will include all embodiments falling within the scope of the appended claims.

The invention claimed is:

1. A latch assembly for a tailgate on a truck, the tailgate including a shaft extending perpendicular from a top of the tailgate, the latch assembly comprising:
   a striker plate including a striker plate notch at a first end configured to receive the shaft of the tailgate to partially surround it, a base plate extending from a second end of the striker plate, and a guide plate extending from the striker plate, parallel to the base plate and defining a guide notch;
   a clasp including a clasp notch at a first end configured to receive the shaft of the tailgate to partially surround it, and a pivot point at a second end, the clasp further comprises a U-shaped bracket including first and second arms extending from a flat center portion attached to the clasp first end;
   a handle including a free end and an anchored end, the second anchored end being attached to the U-shaped bracket and defining a handle pivot point between the handle and the arms of the bracket;
   a fastening mechanism attached to the striker plate, between the base plate and the guide plate;
   wherein, in use, when the shaft is received into the striker plate notch, the clasp is pivoted toward the shaft to have the shaft surrounded by the clasp notch;
   when the shaft is securely positioned between the clasp notch and the striker plate notch, the handle can be pivoted in a first direction, moving the free end of the handle toward the striker plate, the free end being received in the guide notch and being latched by the fastening mechanism.

2. The latch assembly of claim 1, wherein the striker plate includes a back plate attached to a base plate at a first approximately right angle, the first notch being located at an end of the back plate opposite the first approximately right angle.

3. The latch assembly of claim 1, wherein the handle is capable of moving vertically about the first pivot point.

4. The latch assembly of claim 3, wherein the handle is capable of moving laterally approximately 180 degrees about the second pivot point.

5. The latch assembly of claim 4, further comprising:
   a guide plate extending from the back plate at a second approximately right angle, the guide plate being parallel and adjacent to the base plate, the guide plate having a third notch for guiding the first free end of the handle to the resilient opening of the spring clip.

6. The latch assembly of claim 1, wherein the handle further comprises:

a jaw at the second anchored end, the jaw including an upper jaw attached to the first arm of the U-shaped bracket and a lower jaw attached to the second arm of the U-shaped bracket.

7. A latch assembly comprising:

a L-shaped striker plate including a back plate at one end and a striker plate notch at an opposite end configured to partially surround a shaft of a tailgate, the striker plate further comprises a guide plate having a guide notch, the back plate and the guide plate extending from the striker plate at an approximately right angle;

a clasp having a pivot point at one end and a clasp notch at an opposite end and configured to partially surround the shaft of the tailgate, the clasp including a U-shaped bracket;

a handle including a projection having a free end and a jaw attached to an opposed end, the jaw is configured to be attached to the U-shaped bracket to define a pivot point;

a fastening mechanism attached to the striker plate between the base plate and the guide plate, the fastening mechanism includes a spring clip;

wherein, in use when the shaft is received into the striker plate notch, the clasp is pivoted toward the shaft to have the shaft surrounded by the clasp notch;

when the shaft is securely positioned between the clasp notch and the striker plate notch, the handle can be pivoted in a first direction, moving the free end of the handle toward the striker plate, the free end being received in the guide notch and being latched by the spring clip of the fastening mechanism.

8. The latch assembly of claim 7, further comprising:

a guide plate extending from the back plate parallel to the base plate, the guide plate having a notch for guiding the first free end of the projection to the spring clip.

9. The latch assembly of claim 8, further comprising:

a screw bracket having a first side attached to the base, a second side attached to the guide plate, a bottom attached to the striker plate, and a top attached to the fastening mechanism.

10. The latch assembly of claim 7, wherein the spring clip expands to receive the first free end of the projection and contracts to retain the first free end of the projection.

11. The latch assembly of claim 7, wherein the U-shaped bracket includes a first arm extending from a first side of a flat center portion and a second arm extending from a second side of the flat center portion.

12. The latch assembly of claim 11, wherein jaw includes an upper jaw riveted to the first arm of the U-shaped bracket and a lower jaw riveted to the second arm of the U-shaped bracket.

13. The latch assembly of claim 12, wherein the rivets attached the U-shaped bracket and the jaw define the vertical axis.

14. A latch assembly comprising:

a striker plate including a back plate, a base plate, a guide plate, and a screw bracket, the back plate and the base plate joined at a first approximately right angle, the back plate having a striker plate notch at an end opposite the first approximately right angle configured to partially surround a shaft of a tailgate, the guide plate at a second approximately right angle from the back plate and having a guide notch at an end opposite the second approximate right angle from the back plate, and the screw bracket extending between the back plate, the base plate and the guide plate;

a clasp including a U-shaped bracket and a clasp plate having a clasp notch configured to partially surround the shaft of the tailgate, the U-shaped bracket having two arms, each arm extending at third approximately right angles from a flat center portion attached to a first end of the clasp plate, a second end of the clasp plate attached to the back plate of the striker plate and defining pivot point;

a handle including a projection having a free end and an anchored end attached to a center of a jaw, the jaw having an upper jaw and a lower jaw, each extending from the center of the jaw and being attached to the respective arms of the U-shaped bracket, defining a handle pivot point;

a fastening mechanism attached to the screw bracket, the fastening mechanism including a spring clip having a resilient opening;

wherein, in use, when the shaft is received into the striker plate notch, the clasp is pivoted toward the shaft to have the shaft surrounded by the clasp notch;

when the shaft is securely positioned between the clasp notch and the striker plate notch, the handle can be pivoted in a first direction, moving the free end of the handle toward the striker plate, the free end being received in the guide notch and being latched by the spring clip of the fastening mechanism.

15. The latch assembly of claim 14, wherein projection moves approximately 180 degrees about the second pivot point.

16. The latch assembly of claim 14, further comprising:

a grip surrounding the projection; and a plug inserted into the first free end of the projection.

17. The latch assembly of claim 14, further comprising:

a reinforcement plate attached to the back of the striker plate opposite the clasp plate.

18. The latch assembly of claim 14, wherein the first free end of the projection is received into the second notch and guided to the resilient opening of the spring clip.

19. The latch assembly of claim 14, wherein the latch assembly is between approximately 5 and 15 inches long.

* * * * *